(12) United States Patent
Van Druff et al.

(10) Patent No.: US 7,681,953 B2
(45) Date of Patent: Mar. 23, 2010

(54) ADJUSTABLE ARTICULATING CREW SEAT

(75) Inventors: Charles E. Van Druff, Laguna Hills, CA (US); Daniel H. Meggs, Las Vegas, NV (US); John Churilla, Riverside, CA (US)

(73) Assignee: Conax Florida Corporation, St. Petersburg, FL (US)

( * ) Notice: Subject to any disclaimer, the term of this patent is extended or adjusted under 35 U.S.C. 154(b) by 466 days.

(21) Appl. No.: 11/376,471

(22) Filed: Mar. 14, 2006

(65) Prior Publication Data

US 2006/0284466 A1 Dec. 21, 2006

Related U.S. Application Data

(60) Provisional application No. 60/692,196, filed on Jun. 17, 2005.

(51) Int. Cl.
 *B60N 2/10* (2006.01)
(52) U.S. Cl. .................. 297/327; 297/335; 297/365; 297/DIG. 10
(58) Field of Classification Search ............. 297/301.7, 297/302.1, 302.7, 326, 327, 335.336, 364, 297/365, DIG. 10
See application file for complete search history.

(56) References Cited

U.S. PATENT DOCUMENTS

| | | | |
|---|---|---|---|
| 2,130,781 A * | 9/1938 | Willoughby | 297/365 |
| 3,343,871 A * | 9/1967 | Yates et al. | 297/323 |
| 3,434,756 A * | 3/1969 | Walkinshaw | 297/301.4 |
| 4,067,249 A * | 1/1978 | Deucher | 297/330 |
| 4,225,184 A | 9/1980 | Strowick | |
| 4,456,086 A * | 6/1984 | Wier et al. | 297/DIG. 10 |
| 4,832,402 A * | 5/1989 | Zund | 297/302.7 |
| 5,207,480 A | 5/1993 | Johnson et al. | |
| 5,364,151 A * | 11/1994 | Yurasits | 296/65.09 |
| 5,590,932 A | 1/1997 | Olivieri | |
| 5,622,410 A | 4/1997 | Robinson | |
| 5,749,625 A | 5/1998 | Robinson | |
| 5,803,545 A * | 9/1998 | Guguin | 297/316 |
| 5,813,726 A | 9/1998 | Husted | |
| 6,033,020 A * | 3/2000 | Ito | 297/302.4 |
| 6,079,763 A * | 6/2000 | Clemente | 296/65.05 |
| 6,345,867 B1 | 2/2002 | Hellrung et al. | |
| 6,398,304 B1 * | 6/2002 | Chen et al. | 297/327 |
| 2003/0025375 A1 | 2/2003 | Gray | |

* cited by examiner

*Primary Examiner*—Peter R. Brown
(74) *Attorney, Agent, or Firm*—GrayRobinson, P.A.

(57) ABSTRACT

A vehicle occupant restraint system includes a seat base pivotally connected to a seat mounting point and seat back pivotally connecting to the seat base. The seat base pivot reside proximal to a forward edge of the seat base and the seat back pivot resides proximal to a rearward edge of the seat base. Each pivot includes a toothed rack, and an engaging member for locking the pivot. The teeth define a radius about the pivots. The engaging members are attached to the seat base and are actuated by levers attached to the seat base. A harness is attached to the seat to prevent injury of an occupant in the event of a unanticipated maneuver, crash, rough terrain, or turbulence. The restraint system comprises a robust mechanism to withstand crash loads and offer sufficient adjustment between sitting and standing positions to accommodate an occupant's duties.

16 Claims, 4 Drawing Sheets

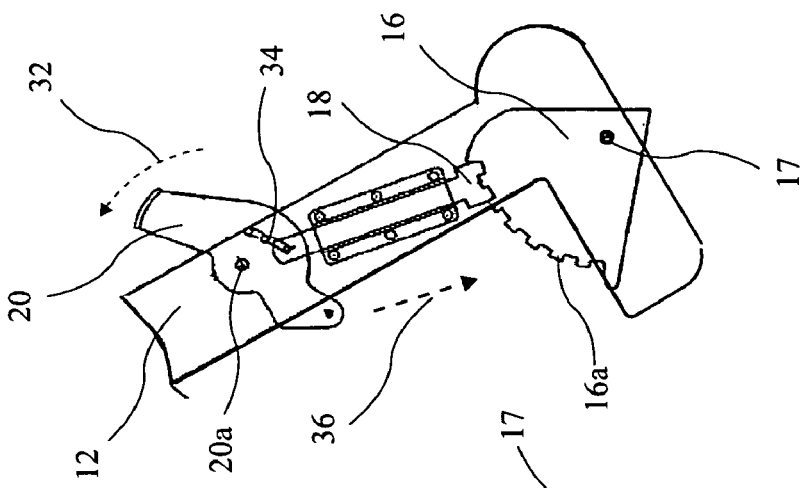
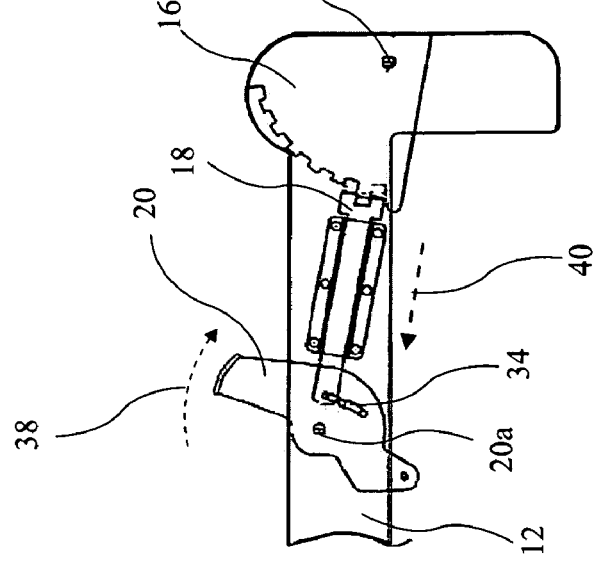
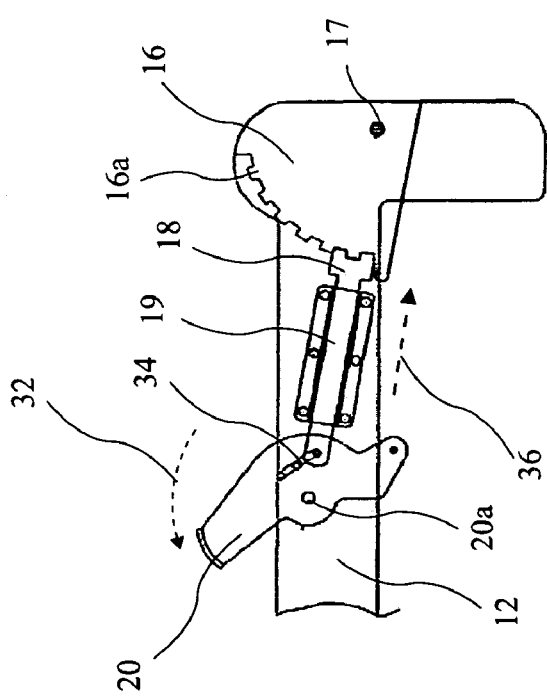
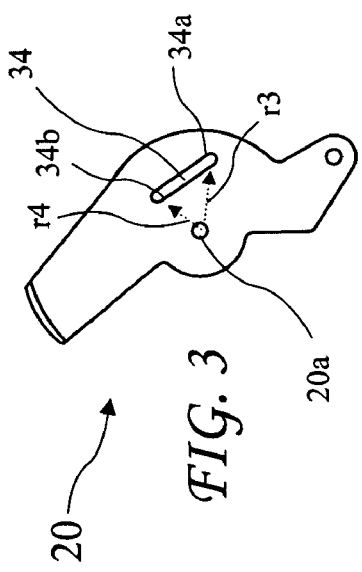
FIG. 2A
FIG. 2B
FIG. 2C
FIG. 3

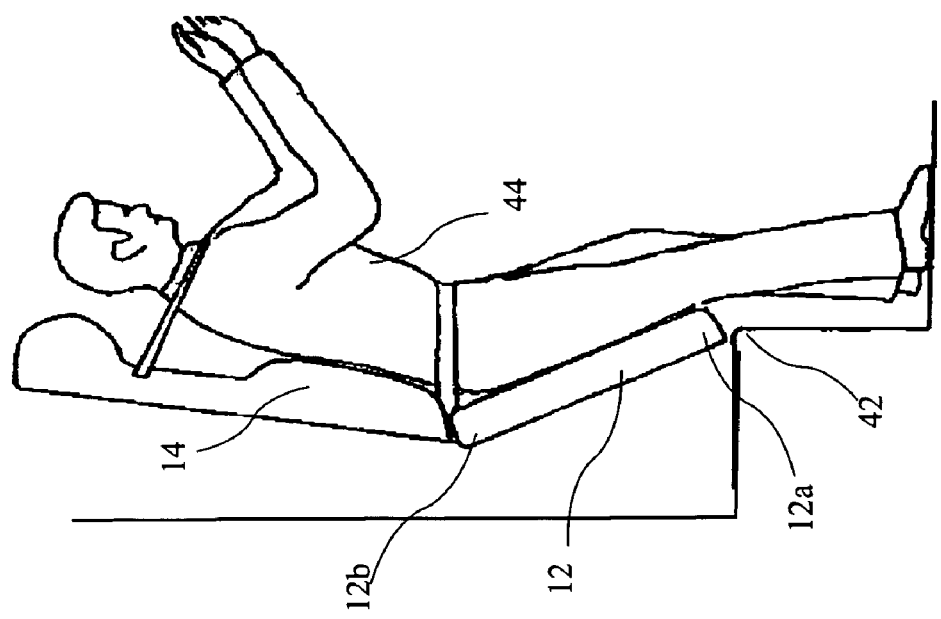
FIG. 6C
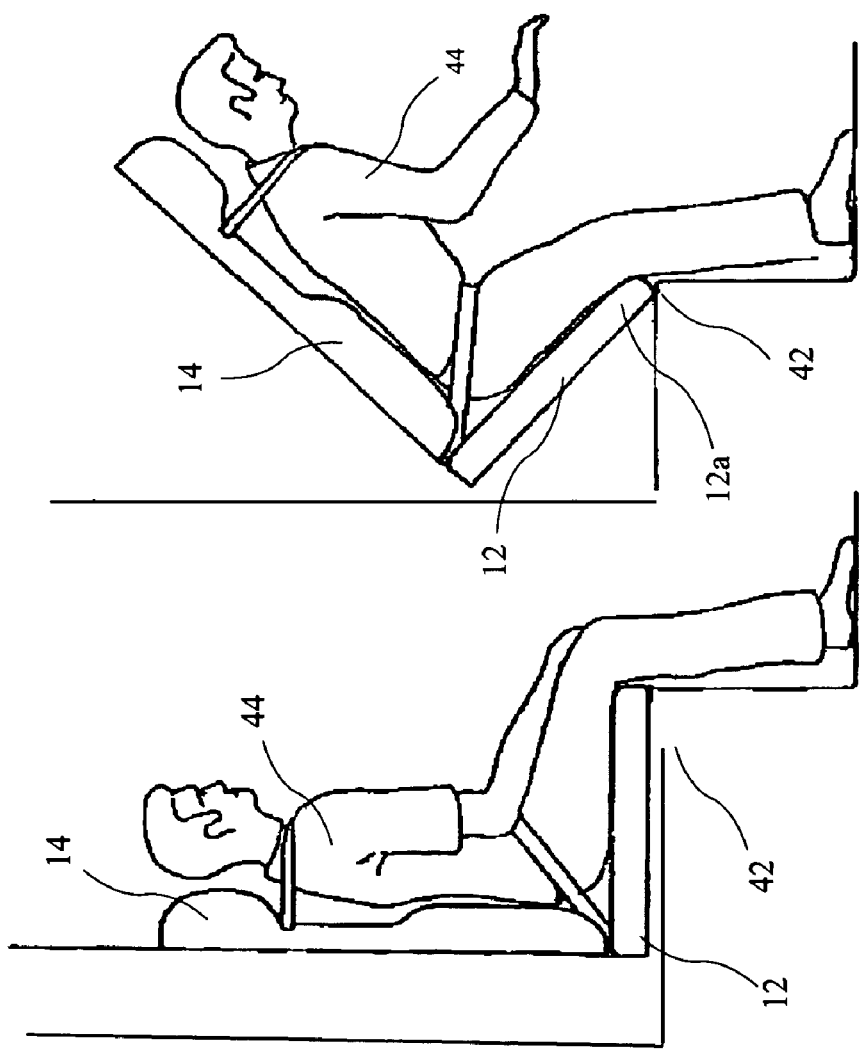
FIG. 6B
FIG. 6A

ADJUSTABLE ARTICULATING CREW SEAT

The present application claims the benefit of U.S. Provisional Application Ser. No. 60/692,196, filed Jun. 17, 2005, which application is incorporated herein by reference.

BACKGROUND OF THE INVENTION

The present invention relates to vehicle occupant restraint and in particular to an adjustable occupant restraint allowing limited occupant movement in a moving vehicle.

Numerous vehicles (land, water and air) require that passengers/crew be mobile during vehicle operation. Such mobility may cause problems for the mobile occupant if the vehicle makes a sharp turn, is involved in a crash, or encounters turbulent conditions. For the ambulance community, in particular, the accident/injury rate for occupants is one of the highest for all types of motor vehicles. Current operational procedures include being completely unrestrained to perform duties, or wearing a harness which allows the occupant to move away from the seat while still attached by straps. The issues with such procedures are that the occupant is not restrained to a substantially rigid seat, and thus is exposed to a risk of contact with hard interior components during a crash. The unrestrained occupant would continue in the direction of original vehicle travel until stopped by contact with a vehicle interior object. In the case of a harness, the occupant would swing around on the end of the straps until interior contact. All of these cases subject the occupant to a greater potential for injury than an occupant restrained to a rigid seat structure.

BRIEF SUMMARY OF THE INVENTION

The present invention addresses the above and other needs by providing a vehicle occupant restraint system which includes a seat base pivotally connected to a seat mounting point and seat back pivotally connecting to the seat base. The seat base pivot reside proximal to a forward edge of the seat base and the seat back pivot resides proximal to a rearward edge of the seat base. Each pivot includes a toothed rack, and an engaging member for locking the pivot. The teeth define a radius about the pivots. The engaging members are attached to the seat base and are actuated by levers attached to the seat base. A harness is attached to the seat to prevent injury of an occupant in the event of a unanticipated maneuver, crash, rough terrain, or turbulence. The restraint system comprises a robust mechanism to withstand crash loads and offer sufficient adjustment between sitting and standing positions to accommodate an occupant's duties.

In accordance with one aspect of the invention, there is provided an adjustable vehicle occupant restraint system. The occupant restraint system comprises a seat mounting point, a seat base pivotally mounted to the seat mounting point proximal to a forward edge of the seat base, and a seat back pivotally mounted proximal to a rearward edge of the seat base. A seat base locking mechanism pivotally locks the seat base in one of at least two seat base positions with respect to the seat mounting point and a seat back locking mechanism pivotally locks the seat back into one of at least two seat back positions with respect to the seat base. A harness restrains the occupant with respect to the seat base and/or the seat back. A seat base lever disengages the seat base locking mechanism to permit the seat base to pivot from a first seat base position to a second seat base position, and a seat back lever disengages the seat back locking mechanism to permit the seat back to pivot from a first seat back position to a second seat back position.

In accordance with another aspect of the invention, there is provided an adjustable vehicle occupant restraint system. The adjustable vehicle occupant restraint system includes a seat base pivotally mounted to a seat mounting point by a seat base pivot proximal to a forward edge of the seat base and a seat back pivotally mounted to the seat base by a seat back pivot proximal to a rearward edge of the seat base. A seat base locking mechanism locks the seat base to the seat mounting point using a seat base toothed member having angularly spaced apart first teeth and a seat base engaging member configured to engage at least one of the first teeth to lock the position of the seat base. A seat back locking mechanism locks the seat back to the seat base using a seat back toothed member having angularly spaced apart second teeth and a seat back engaging member configured to engage at least one of the second teeth to lock the position of the seat back.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2A shows a seat base in a first seat base position with a seat base pivot locked.

FIG. 2B shows the seat base in the first seat base position with the seat base pivot unlocked FIG. 2C shows the seat base in a second seat base position with the seat base pivot locked.

FIG. 3 is a detailed view of a seat base lever showing a first slot with a third radius and a fourth radius.

FIG. 6A shows an occupant in the crew seat in a first seat base position and a first seat back position.

FIG. 6B shows the occupant in the crew seat in a second seat base position and the first seat back position.

FIG. 6C shows the occupant in the crew seat in a third seat base position and a second seat back position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
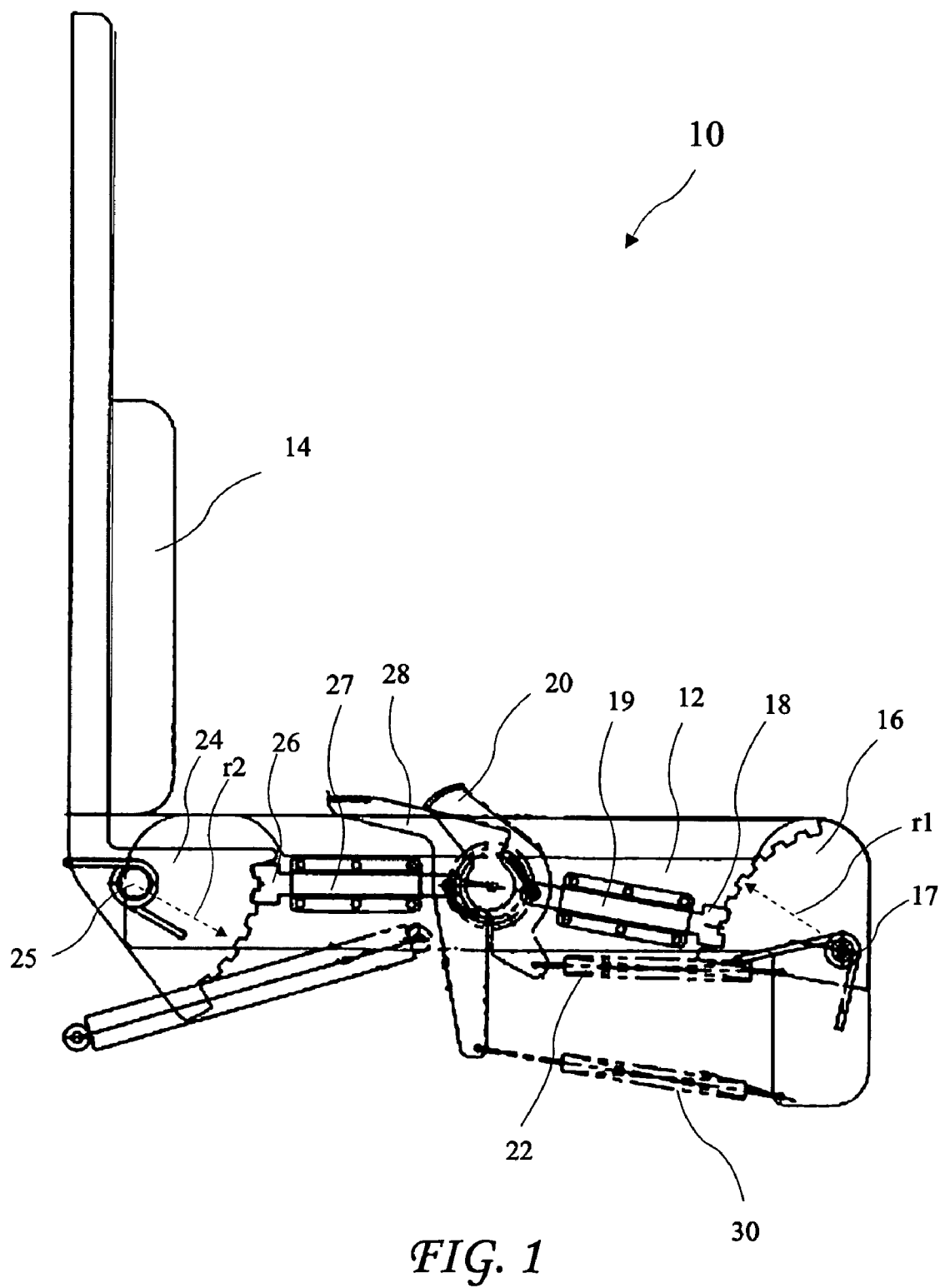
FIG. 1 is a crew seat according to the present invention.

An articulating seat 10 shown in FIG. 1 allows an occupant reasonable freedom of movement while still safely attached to a fixed seat. The seat 10 typically has a four or five point seatbelt system but could also offer some protection with a simple two-point lap belt or three-point shoulder strap lap belt restraint system. The restraint system may have extending/retractable straps that would automatically lock in a crash. Typically, the extending/retractable straps would be for the occupant's shoulders only, but this is not always the case.

The seat 10 comprises a seat base 12 and a seat back 14. The seat base 12 pivots about a seat base pivot (or hinge) 17 attached to a seat mounting point 42 (see FIG. 6A-6C). The seat base 12 is held in position by the cooperation of a seat base engaging member (or locking pawl) 18 and a seat base toothed member 16. The engaging member 18 is limited to linear motion by a first bracket 19 or the like. The toothed member 16 includes a plurality of angularly spaced apart teeth 16a (see FIG. 2A) at a common radius r1 from the pivot 17. The engaging member 18 fixes the rotational position of the seat base 12 by engaging at least one tooth 16a of the toothed member 16. The engaging member 18 may be advanced to engage the teeth by rotating a seat base lever 20 counterclockwise, wherein the engaging member 18 (see FIG. 2A) is moved toward the toothed member 16. The engaging member 18 may be retracted to disengage from the teeth by rotating the seat base lever 20 clockwise, wherein the engaging member 18 (see FIG. 2B) is moved away from the toothed member 16 (see FIG. 2B). A first spring 22 biases the engaging member 18 into the engaged (counterclockwise) position.

The seat back 14 is pivotally coupled to the seat base 12 in a manner similar to the coupling of the seat base 12 to the seat mounting point 42. A seat back engaging member (or locking pawl) 26 engages teeth 24a (see FIG. 4A) of a seat back toothed member 24 attached to the seat back 14. The seat back 14 pivots about a seat back (or second) pivot (or hinge) 25 attached to the seat base 12. The toothed member 24 includes a plurality of angularly spaced apart teeth 24a at a common radius r2 from the pivot 25. The engaging member 26 is limited to linear motion by a second bracket 27 or the like. The seat back engaging member 26 may be advanced to engage the teeth 24a by rotating a seat back lever 28 counterclockwise, wherein the engaging member 26 is moved toward the toothed member 24. The engaging member 26 may be retracted to disengage from the teeth 26a by rotating a seat back lever 28 clockwise, wherein the engaging member 26 is moved away from the toothed member 24. A second spring 30 biases the engaging member 26 into the engaged position.

A detailed view of the seat base 12 in a first seat bottom position, and with the engaging member 18 engaging the toothed member 16, is shown in FIG. 2A. The lever 20 is in a counterclockwise position as indicated by a first arc 32. A slot 34 (see FIG. 3) in the lever 20 has a lower slot end 34a at a third and greater radius r3 from a seat base lever pivot point 20a and a higher slot end 34b at a fourth and lesser radius r4 from the seat base lever pivot point 20a. The engaging member 18 is biased along arrow 36 into engagement with the toothed member 16 by the cooperation of the engaging member 18 with the slot 34 in the lever 20. Thus, when the lever 20 is in the counterclockwise position, the engaging member 18 is pushed to the right, and engages the toothed member 16.

A detailed view of the engaging member 18 disengaged from the toothed member 16 with the seat base 12 remaining in the first seat position is shown in FIG. 2B. The lever 20 is in a clockwise position as indicated by a second arc 38. The engaging member 18 is pulled along arrow 40 into disengagement from the toothed member 16 by the cooperation of the engaging member 18 with the slot 34 in the lever 20. As the lever 20 moves to the clockwise position the slot end of the engaging lever 18 follows the slot to the higher slot end 34b and is pulled towards the seat base lever pivot point 20a and away from the toothed member 16.

A detailed view of the seat base 12 in a second seat base position (a raised position) with the engaging member 18 engaging the toothed member 16, is shown in FIG. 2C. The lever 20 is in a counterclockwise position as indicated by the arc 32. The engaging member 18 is pushed along arrow 36 into engagement with the toothed member 16 by the cooperation of the engaging member 18 with the slot 34 in the lever 20. The seat base 12 may be further be locked into one of a multiplicity of intermediate seat base positions by engaging the engaging member 18 with an intermediate tooth of the toothed member 16.

A detailed view of the lever 20 is shown in FIG. 3. The slot 34 has a lower end 34a at a third radius r3 from the pivot point 20a, and the slot 34 has a higher end 34b at a fourth radius r4 from the pivot point 20a. The radius r3 is greater than the radius r4. The difference between radius r3 and radius r4 results in a translation of the engaging member 18 when the lever 34 is rotated about the pivot point 20a, which translation is sufficient to disengage the engaging member 18 from the toothed member 16.

Figure 4A:
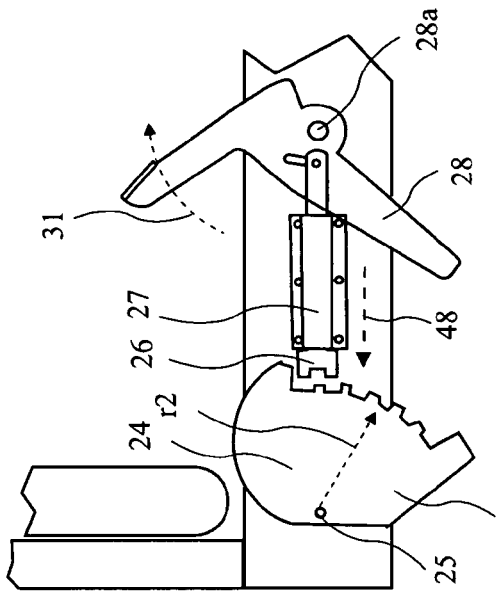
FIG. 4A shows a seat back in a first seat back position with a seat back pivot locked.

A detailed view of the seat back 14 in a first seat back position, and with the engaging member 24 engaging the toothed member 24, is shown in FIG. 4A. The lever 28 is in a counterclockwise position as indicated by a fourth arc 29. A slot 35 (see FIG. 5) in the lever 28 has a upper slot end 35a at a fifth and greater radius r5 from a seat back lever pivot 28a (which may coincide with the pivot point 20a) and a lower slot end 35b at a sixth and lesser radius r6 from the seat back lever pivot point 28a. The engaging member 26 is biased along arrow 46 into engagement with the toothed member 24 by the cooperation of the engaging member 26 with the slot 35 in the lever 28. Thus, when the lever 28 is in the counterclockwise position, the engaging member 26 is pushed to the left, and engages the toothed member 24.

Figure 4B:
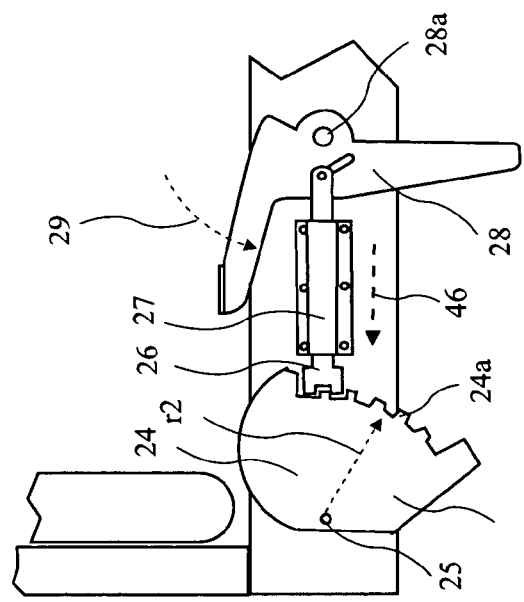
FIG. 4B shows the seat back in the first seat back position with the seat back pivot unlocked

A detailed view of the engaging member 26 disengaged from the toothed member 24 with the seat back 14 remaining in the first seat back position is shown in FIG. 4B. The lever 28 is in a clockwise position as indicated by a second arc 31. The engaging member 26 is pulled along arrow 48 into disengagement from the toothed member 24 by the cooperation of the engaging member 26 with the slot 35 in the lever 28. As the lever 28 moves to the clockwise position, the slot end of the engaging lever 26 follows the slot 35 to the lower slot end 35b and is pulled towards the lever pivot point 28a and away from the toothed member 24.

Figure 4C:
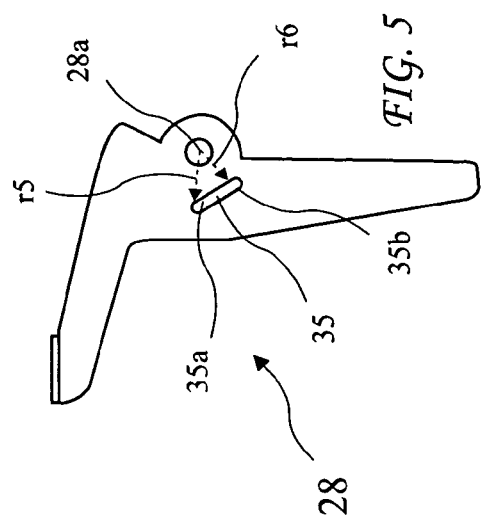
FIG. 4C shows the seat back in a second seat back position with the seat back pivot locked.

A detailed view of the seat back 14 in a second seat back position (a straightened position) with the engaging member 26 engaging the toothed member 24, is shown in FIG. 4C. The lever 28 is in a counterclockwise position as indicated by the arc 29. The engaging member 26 is pushed along arrow 46 into engagement with the toothed member 24 by the cooperation of the engaging member 26 with the slot 35 in the lever 28.

Figure 5:
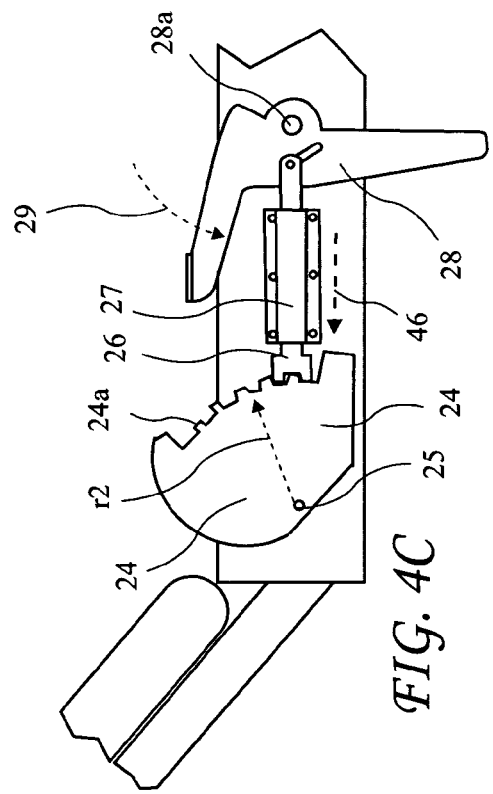
FIG. 5 is a detailed view of a seat back lever showing a second slot with a fifth radius and a sixth radius.

A detailed view of the lever 28 is shown in FIG. 5. The slot 33 has a lower end 35b at a fifth radius r5 from the pivot point 28a, and the slot 35 has a lower end 35b at a sixth radius r6 from the pivot point 28a. The radius r5 is greater than the radius r6. The difference between radius r5 and radius r6 results in a translation of the engaging member 26 when the lever 35 is rotated about the pivot point 28a, which translation is sufficient to disengage the engaging member 26 from the toothed member 24.

A seat occupant 44 is shown in a fully seated position in FIG. 6A, in a partially seated position in FIG. 6B, and in a standing position in FIG. 6C. The seat 10 position in FIG. 6A corresponds to the seat base 12 being in the first seat base position and the seat back 14 being in the first seat back position. The partially seated position in FIG. 6B corresponds to the seat base 12 being in an intermediate seat position and the seat back 14 remaining in the first seat back position, wherein the seat base 12 has pivoted about a point proximal to a seat base forward edge 12a. The standing position in FIG. 6C corresponds to the seat base being in the second seat base position and the seat back being in a second seat back position, wherein the seat back 14 has pivoted about a point proximal to a seat base rearward edge 12b.

While the invention herein disclosed has been described by means of specific embodiments and applications thereof, numerous modifications and variations could be made thereto by those skilled in the art without departing from the scope of the invention set forth in the claims.

The invention claimed is:

1. An adjustable vehicle occupant restraint system for use within a vehicle comprising:
   a seat mounting point;
   a seat base pivotally mounted to the seat mounting point by a seat base pivot proximal to a forward edge of the seat base;
   a seat back pivotally mounted to the seat base proximal to a rearward edge of the seat base;
   a seat base locking mechanism comprising a seat base toothed member to pivotally lock the seat base in one of at least two seat base positions with respect to the seat mounting point; and
   a seat back locking mechanism to pivotally lock the seat back in one of at least two seat back positions with respect to the seat base;
   a seat base engaging member configured to engage the toothed member to lock the position of the seat base with respect to the seat mounting point;
   wherein in a first position the seat base is not substantially inclined relative to the seat mounting point and in a second position the seat base is inclined rearwardly relative to the seat mounting point, whereby the seat base and seat back are adapted to support a sitting occupant in the first position and a standing occupant in the second position, and wherein the seat back and seat base can be positioned independently of one another.

2. The occupant restraint system of claim 1, further including a harness to restrain the occupant with respect to at least one of the set consisting of the seat base and the seat back.

3. The occupant restraint system of claim 2, wherein the harness comprises a seat belt and a shoulder harness.

4. The occupant restraint system of claim 1, further including a seat base lever for disengaging the seat base locking mechanism to permit the seat base to pivot from a first seat base position to a second seat base position.

5. The occupant restraint system of claim 4, wherein the seat base locking mechanism is configured to lock the seat base in at least one intermediate seat base position between the first seat base position and the second seat base position.

6. The occupant restraint system of claim 1, further including a seat back lever for disengaging the seat back locking mechanism to permit the seat back to pivot from a first seat back position to a second seat back position.

7. The occupant restraint system of claim 6, wherein the seat back locking mechanism is configured to lock the seat back in at least one intermediate seat back position between the first seat back position and the second seat back position.

8. The occupant restraint system of claim 1, wherein seat base engaging member is limited to a linear motion by a first bracket.

9. The occupant restraint system of claim 8, wherein:
   the seat base engaging member is movable between an engaged position and a disengaged position;
   in the engaged position, the seat base engaging member engages the toothed member to lock the seat base with respect to the seat mounting point;
   in the disengaged position, the seat base engaging member disengages from the toothed member to unlock the seat base with respect to the seat mount; and
   the seat base engaging member is biased to the engaged position.

10. The occupant restraint system of claim 1, wherein:
    the seat back is pivotally connected to the seat base by a seat back pivot;
    the seat back locking mechanism comprises a seat back toothed member having angularly spaced apart second teeth at a second radius; and
    a seat back engaging member configured to engage at least one of the second teeth to lock the position of the seat back with respect to the seat base.

11. The occupant restraint system of claim 10, wherein seat back engaging member is limited to a linear motion by a second bracket.

12. The occupant restraint system of claim 10, wherein:
    the seat back engaging member is movable between a second engaged position and a second disengaged position;
    in the second engaged position, the seat back engaging member engages the second teeth to lock the seat back with respect to the seat base;
    in the second disengaged position, the seat back engaging member disengages from the second teeth to unlock the seat back with respect to the seat base; and
    the seat back lever is biased to a locked position.

13. An adjustable vehicle occupant restraint system comprising:
    a seat mounting point;
    a seat base pivotally mounted to the seat mounting point by a seat base pivot proximal to a forward edge of the seat base;
    a seat back pivotally mounted to the seat base proximal to a rearward edge of the seat base;
    a seat base locking mechanism comprising a seat base toothed member to pivotally lock the seat base in one of at least two seat base positions with respect to the seat mounting point; and
    a seat back locking mechanism to pivotally lock the seat back in one of at least two seat back positions with respect to the seat base;
    a seat base engaging member configured to engage the toothed member to lock the position of the seat base with respect to the seat mount;
    wherein the seat base engaging member is limited to a linear motion by a first bracket and is movable between engaged and disengaged positions such that in the engaged position, the seat base engaging member engages the toothed member to lock the seat base with respect to the seat mount point and in the disengaged position, the seat base engaging member disengages from the toothed member to unlock the seat base with respect to the seat mount; and
    the seat base engaging member being biased to the engaged position;
    a seat base lever pivoting about a seat base lever pivot point;
    the seat base lever including a first slot, the first slot having a first slot end at a third and greater radius from the seat base lever pivot point and a second slot end at a fourth and lesser radius from the seat base lever pivot point;
    the seat base engaging member cooperating with the first slot to translate a rotation of the seat base lever into a translation of the seat base engaging member to engage and disengage the seat base engaging member from the toothed member.

14. An adjustable vehicle occupant restraint system comprising:
- a seat mounting point;
- a seat base pivotally mounted to the seat mounting point by a seat base pivot proximal to a forward edge of the seat base;
- a seat back pivotally mounted to the seat base proximal to a rearward edge of the seat base at a seat back pivot;
- a seat base locking mechanism comprising a seat base toothed member to pivotally lock the seat base in one of at least two seat base positions with respect to the seat mounting point; and
- a seat back locking mechanism comprising a seat back toothed member having angularly spaced apart second teeth at a second radius to pivotally lock the seat back in one of at least two seat back positions with respect to the seat base;
- a seat base engaging member configured to engage the seat base toothed member to lock the position of the seat base with respect to the seat mount;
- a seat back engaging member configured to engage at least one of the second teeth to lock the position of the seat back with respect to the seat base;
- the seat back engaging member is movable between a second engaged position and a second disengaged position wherein in the second engaged position, the seat back engaging member engages the second teeth to lock the seat back with respect to the seat base and in the second disengaged position, the seat back engaging member disengages from the second teeth to unlock the seat back with respect to the seat base; and
- the seat back engaging member being biased to a locked position;
- a seat back lever pivoting about a seat back lever pivot point;
- the seat back lever including a second slot, the second slot having a third slot end at a fifth and greater radius from the seat back lever pivot point and a fourth slot end at a sixth and lesser radius from the seat back lever pivot point;
- the cooperation of the seat back engaging member with the second slot translates a rotation of the seat back lever into a translation of the seat back engaging member to engage and disengage the seat back engaging member from the second teeth.

15. An adjustable vehicle occupant restraint system comprising:
- a seat mounting point;
- a seat base pivotally mounted to the seat mounting point by a seat base pivot proximal to a forward edge of the seat base;
- a seat base locking mechanism comprising:
  - a seat base toothed member having angularly spaced apart first teeth at a first radius; and
  - a seat base engaging member configured to engage at least one of the first teeth to lock the position of the seat base with respect to the seat mount;
- a seat back pivotally mounted to the seat base proximal to a rearward edge of the seat base; and
- a seat back locking mechanism to pivotally lock the seat back in one of at least two seat back positions with respect to the seat base wherein the seat base engaging member is movable between an engaged position and a disengaged position, wherein in the engaged position, the seat base engaging member engages the first teeth to lock the seat base with respect to the seat mount point and in the disengaged position, the seat base engaging member disengages from the first teeth to unlock the seat base with respect to the seat mount; and
- the seat base engaging member is biased to the engaged position;
- a seat base lever pivoting about a seat base lever pivot point;
- the seat base lever includes a first slot, the first slot having a first slot end at a third and greater radius from the seat base lever pivot point a second slot end at a fourth and lesser radius from the seat base lever pivot point;
- the cooperation of the seat base engaging member with the first slot translates a rotation of the seat base lever into a translation of the seat base engaging member to engage and disengage the seat base engaging member from the first teeth.

16. An adjustable vehicle occupant restraint system comprising:
- a seat mounting point;
- a seat base pivotally mounted to the seat mounting point by a seat base pivot proximal to a forward edge of the seat base;
- a seat base locking mechanism comprising:
  - a seat base toothed member having angularly spaced apart first teeth at a first radius; and
  - a seat base engaging member configured to engage at least one of the first teeth to lock the position of the seat base with respect to the seat mount;
- a seat back pivotally mounted to the seat base by a seat back pivot proximal to a rearward edge of the seat base; and
- a seat back locking mechanism comprising:
  - a seat back toothed member having angularly spaced apart second teeth at a second radius; and
  - a seat back engaging member configured to engage at least one of the second teeth to lock the position of the seat back with respect to the seat base
- wherein the seat back engaging member is movable between a second engaged position and a second disengaged position, wherein in the second engaged position, the seat back engaging member engages the second teeth to lock the seat back with respect to the seat base and in the second disengaged position, the seat back engaging member disengages from the second teeth to unlock the seat back with respect to the seat base; and
- a seat back lever that is biased to a locked position;
- and further wherein the seat back lever pivots about a seat back lever pivot point;
- the seat back lever including a second slot, the second slot having a third slot end at a fifth and greater radius from the seat back lever pivot point and a fourth slot end at a sixth and lesser radius from the seat back lever pivot point;
- the cooperation of the seat back engaging member with the second slot translates a rotation of the seat back lever into a translation of the seat back engaging member to engage and disengage the seat back engaging member from the second teeth.

* * * * *